(12) United States Patent
Novack et al.

(10) Patent No.: US 10,677,991 B2
(45) Date of Patent: Jun. 9, 2020

(54) OPTICAL COUPLER COMPRISING VERTICALLY OFFSET WAVEGUIDE CORES

(71) Applicant: Elenion Technologies, LLC, New York, NY (US)

(72) Inventors: Ari Novack, New York, NY (US); Ruizhi Shi, New York, NY (US); Michael J. Hochberg, New York, NY (US); Thomas Baehr-Jones, Arcadia, CA (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 16/189,087

(22) Filed: Nov. 13, 2018

(65) Prior Publication Data

US 2019/0094468 A1  Mar. 28, 2019

Related U.S. Application Data

(63) Continuation of application No. 15/685,765, filed on Aug. 24, 2017, now Pat. No. 10,156,678, which is a
(Continued)

(51) Int. Cl.
| | |
|---|---|
| *G02B 6/12* | (2006.01) |
| *G02B 6/14* | (2006.01) |
| *G02B 6/30* | (2006.01) |
| *G02B 6/136* | (2006.01) |
| *G02B 6/134* | (2006.01) |
| *G02B 6/293* | (2006.01) |

(Continued)

(52) U.S. Cl.
CPC ............ *G02B 6/305* (2013.01); *G02B 6/125* (2013.01); *G02B 6/1228* (2013.01); *G02B 6/132* (2013.01); *G02B 6/134* (2013.01); *G02B 6/136* (2013.01); *G02B 6/14* (2013.01); *G02B 6/29332* (2013.01); *G02B 6/12002* (2013.01); *G02B 6/1223* (2013.01); *G02B 6/2821* (2013.01); *G02B 2006/12121* (2013.01); *G02B 2006/12123* (2013.01)

(58) Field of Classification Search
CPC .... G02B 6/107; G02B 6/125; G02B 27/0012; G06F 17/5001; G06F 17/5077
See application file for complete search history.

(56) References Cited

U.S. PATENT DOCUMENTS 6,330,378 B1 * 12/2001 Forrest ............... G02B 6/12002
372/50.21
9,122,006 B1 * 9/2015 Roth ...................... G02B 6/126
(Continued)

*Primary Examiner* — Akm E Ullah
(74) *Attorney, Agent, or Firm* — Stratford Managers Corporation

(57) ABSTRACT

A composite optical waveguide is constructed using an array of waveguide cores, in which one core is tapered to a larger dimension, so that all the cores are used as a composite input port, and the one larger core is used as an output port. In addition, transverse couplers can be fabricated in a similar fashion. The waveguide cores are preferably made of SiN. In some cases, a layer of SiN which is provided as an etch stop is used as at least one of the waveguide cores. The waveguide cores can be spaced away from a semiconductor layer so as to minimize loses.

19 Claims, 14 Drawing Sheets

Related U.S. Application Data continuation of application No. 15/418,246, filed on Jan. 27, 2017, now Pat. No. 9,766,408, which is a continuation of application No. 14/798,780, filed on Jul. 14, 2015, now Pat. No. 9,588,298.

(60) Provisional application No. 62/170,772, filed on Jun. 4, 2015.

(51) Int. Cl.
*G02B 6/122* (2006.01)
*G02B 6/125* (2006.01)
*G02B 6/132* (2006.01)
*G02B 6/28* (2006.01)

(56) References Cited

U.S. PATENT DOCUMENTS

| | | | |
|---|---|---|---|
| 9,316,788 B2 * | 4/2016 | Witzens | G02B 6/2813 |
| 9,523,870 B2 * | 12/2016 | Wei | G02F 1/025 |
| 9,715,072 B2 * | 7/2017 | Labeye | G02B 6/12004 |
| 9,766,408 B2 * | 9/2017 | Novack | G02B 6/29332 |
| 9,864,136 B1 * | 1/2018 | Jacob | G02B 6/12004 |
| 2008/0080808 A1 * | 4/2008 | Tolshikhin | G02B 6/12007 385/14 |

* cited by examiner

OPTICAL COUPLER COMPRISING VERTICALLY OFFSET WAVEGUIDE CORES

CROSS-REFERENCE TO RELATED APPLICATIONS

This application is a continuation of, and claims priority from, U.S. patent application Ser. No. 15/685,765, filed Aug. 24, 2017, now allowed, which is a continuation of U.S. patent application Ser. No. 15/418,246, filed Jan. 27, 2017, now U.S. Pat. No. 9,766,408, which is a continuation of and claims priority from U.S. patent application Ser. No. 14/798,780, filed Jul. 14, 2015, now U.S. Pat. No. 9,588,298, which claims priority to U.S. Provisional Application No. 62/170,772, filed Jun. 4, 2015, each of which is hereby incorporated by reference herein in its entirety.

FIELD OF THE INVENTION

The invention relates to optical couplers in general and particularly to optical couplers that optically connect optical fibers and chips.

BACKGROUND OF THE INVENTION

Because silicon has a high refractive index, a single mode silicon waveguide exhibits sub-micron mode size. The observed loss is high when an optical mode couples to a single mode fiber because of a large mode mismatch. Grating couplers have large mode profiles, but their bandwidth is limited and they are usually polarization dependent. Edge couplers have broad bandwidth with small polarization dependent loss. However traditional inverted-taper-based edge couplers usually are constructed to work with lensed fiber because their mode sizes are usually around 3 µm. This imposes difficulties in packaging, because it requires accurate alignment between the edge coupler and the lensed fiber. To match to 10 µm mode field diameter (MFD), people have built $SiO_2$ waveguides with Si/SiN waveguide inside the $SiO_2$, but this method requires a silicon undercut with wet etch to avoid substrate loss which is costly, risky and time-consuming.

Also known in the prior art is Assefa et al., U.S. Pat. No. 7,738,753, issued Jun. 15, 2010, which is said to disclose an optoelectronic circuit fabrication method and integrated circuit apparatus fabricated therewith. Integrated circuits are fabricated with an integral optical coupling transition to efficiently couple optical energy from an optical fiber to an integrated optical waveguide on the integrated circuit. Layers of specific materials are deposited onto a semiconductor circuit to support etching of a trench to receive an optical coupler that performs proper impedance matching between an optical fiber and an on-circuit optical waveguide that extends part way into the transition channel. A silicon based dielectric that includes at least a portion with a refractive index substantially equal to a section of the optical fiber is deposited into the etched trench to create the optical coupler. Silicon based dielectrics with graded indices are also able to be used. Chemical mechanical polishing is used finalize preparation of the optical transition and integrated circuit.

Other relevant publicly available documents that describe the prior art include: M. Wood, P. Sun, and R. M. Reano, "Compact cantilever couplers for low-loss fiber coupling to silicon photonic integrated circuits," Opt. Express, vol. 20, no. 1, p. 164, 2012; L. Chen, C. R. Doerr, Y. Chen, and T. Liow, "Low-Loss and Broadband Cantilever Couplers Between Standard Cleaved Fibers and High-Index-Contrast Si3N4 or Si Waveguides," IEEE Photonics Technol. Lett., vol. 22, no. 23, pp. 1744-1746, 2010; L. Jia, J. Song, T.-Y. Liow, X. Luo, X. Tu, Q. Fang, S.-C. Koh, M. Yu, and G. Lo, "Mode size converter between high-index-contrast waveguide and cleaved single mode fiber using SiON as intermediate material," Opt. Express, vol. 22, no. 19, p. 23652, September 2014; and R. Takei, E. Omoda, M. Suzuki, S. Manako, T. Kamei, M. Mori, and Y. Sakakibara, "Low-loss optical interlayer transfer for three-dimensional optical interconnect," in Proceedings of 10th International Conference on Group IV Photonics (Seoul, South Korea, 2013), pp. 91-92.

There is a need for improved couplers for optically interconnecting chips and optical fibers.

SUMMARY OF THE INVENTION

According to one aspect, the invention features a composite waveguide, comprising: a first group of waveguide cores on a substrate, the first group of waveguide cores having an optical propagation direction, each of the first group of waveguide cores having at a respective first end thereof a first cross section defined by two dimensions measured along orthogonal coordinates and at a respective second end thereof a second cross section defined by two dimensions measured along orthogonal coordinates; the first group of waveguide cores having an input port comprising at least one of: the respective first ends together comprising the optical input port for directed illumination, and a segment of one or more of the first group of waveguide cores comprising the optical input port for evanescent waves; and the first group of waveguide cores having an output port comprising at least one of: the respective second ends of the one or more of the first group of waveguide cores comprising the output port for directed illumination; and a segment of one or more of the first group of waveguide cores comprising the optical output port for evanescent waves.

In one embodiment, the substrate is a semiconductor chip.

In another embodiment, one or more of the first group of waveguide cores has a different second cross section than the second cross section of each of the remaining ones of the first group of waveguide cores.

In a further embodiment, the different second cross section is a larger second cross section than the second cross section of each of the remaining ones of the first group of waveguide cores.

In one more embodiment, the different second cross section is a smaller second cross section than the second cross section of each of the remaining ones of the first group of waveguide cores.

In one embodiment, the composite waveguide is configured to operate bidirectionally.

In another embodiment, at least one of the first end and the second end of the composite waveguide is configured as a butt coupler.

In a further embodiment, at least one of the first end and the second end of the composite waveguide is configured as a taper coupler.

In still another embodiment, at least one of the first end and the second end of the composite waveguide is configured as an evanescent coupler.

In one embodiment, all of the first group of waveguide cores have substantially equal first cross sections.

In another embodiment, the at least two of the first group of waveguide cores have unequal first cross sections.

In yet another embodiment, the first group of waveguide cores are disposed in a one-dimensional array.

In still another embodiment, the first group of waveguide cores are disposed in a two-dimensional array.

In a further embodiment, the first group of waveguide cores comprise a material selected from the group of materials consisting of crystalline silicon, poly-silicon, amorphous silicon, silicon nitride, silicon oxynitride, silicon dioxide, doped silicon dioxide and a polymer.

In yet a further embodiment, the first cross section defined by two dimensions measured along orthogonal coordinates has a first dimension and a second dimension each no larger than 1 micron.

In an additional embodiment, the respective first end of each of the first group of waveguide cores is located at a facet.

In one more embodiment, the facet is a facet selected from the group of facets consisting of etched facets, polished facets, sawed facets, angled facets and curved facets.

In still a further embodiment, the respective first end of each of the first group of waveguide cores is located within 50 microns of a facet.

In one embodiment, the composite waveguide further comprising: a second group of waveguide cores having a second optical propagation direction, the second group of waveguide cores disposed on the substrate, the second group of waveguide cores displaced from the first group of waveguide cores in a direction transverse to the optical propagation direction of the first group of waveguide cores, the second group of waveguide cores in optical communication with the first group of waveguide cores; each of the second group of waveguide cores having at a respective first end thereof a first cross section defined by two dimensions measured along orthogonal coordinates and at a respective second end thereof a second cross section defined by two dimensions measured along orthogonal coordinates; the second group of waveguide cores having an input port comprising at least one of: the respective first ends together comprising the optical input port for directed illumination, and a segment of one or more of the second group of waveguide cores comprising the optical input port for evanescent waves; and the second group of waveguide cores having an output port comprising at least one of: the respective second ends comprising the output port for directed illumination, and a segment of one or more of the second group of waveguide cores comprising the optical output port for evanescent waves.

In another embodiment, one or more of the second group of waveguide cores has a different second cross section than the second cross section of each of the remaining ones of the second group of waveguide cores.

In a further embodiment, the different second cross section is a larger second cross section than the second cross section of each of the remaining ones of the second group of waveguide cores.

In one more embodiment, the different second cross section is a smaller second cross section than the second cross section of each of the remaining ones of the second group of waveguide cores.

In one embodiment, the composite waveguide is configured to operate bidirectionally.

In another embodiment, at least one of the first end and the second end of the composite waveguide is configured as a butt coupler.

In a further embodiment, at least one of the first end and the second end of the composite waveguide is configured as a taper coupler.

In still another embodiment, at least one of the first end and the second end of the composite waveguide is configured as an evanescent coupler.

In a further embodiment, the second group of waveguide cores is configured to provide an optical signal at a location displaced in the transverse direction from the optical input port of the first group of waveguide cores.

In another embodiment, the second group of waveguide cores comprise a material selected from the group of materials consisting of crystalline silicon, poly-silicon, amorphous silicon, silicon nitride, silicon oxynitride, silicon dioxide, doped silicon dioxide and a polymer.

In yet another embodiment, the first cross section defined by two dimensions measured along orthogonal coordinates has a first dimension and a second dimension each no larger than 1 micron.

In still another embodiment, the respective first end of each of the second group of waveguide cores is located at a facet.

In a further embodiment, the respective first end of each of the second group of waveguide cores is located at a facet.

In yet a further embodiment, the facet is a facet selected from the group of facets consisting of etched facets, polished facets, sawed facets, angled facets and curved facets.

In an additional embodiment, the respective first end of each of the first group of waveguide cores is located within 50 microns of a facet.

In still a further embodiment, the second optical propagation direction is parallel to the optical propagation direction of the first group of waveguide cores.

According to another aspect, the invention relates to a method of manufacturing a composite waveguide. The method comprises the steps of: providing a device fabricated with etch stop layers; using at least one of the etch stop layers as a waveguide core of a composite waveguide having an optical input port and an optical output port.

In one embodiment, the etch stop layers comprise a silicon nitride etch stop layer.

In one embodiment, the composite waveguide comprises a group of waveguide cores, each of the group of waveguide cores having at a respective first end thereof a first cross section defined by two dimensions measured along orthogonal coordinates and having at a respective second end thereof a second cross section defined by two dimensions measured along orthogonal coordinates; the first group of waveguide cores having an input port comprising at least one of: the respective first ends together comprising the optical input port for directed illumination, and a segment of one or more of the first group of waveguide cores comprising the optical input port for evanescent waves; and the first group of waveguide cores having an output port comprising at least one of: the respective second ends comprising the output port for directed illumination; and a segment of one or more of the first group of waveguide cores comprising the optical output port for evanescent waves.

According to a further aspect, the invention relates to a method of using a composite waveguide. The method comprises the steps of: providing a composite waveguide having an optical input port and an optical output port, comprising: a first group of waveguide cores on a substrate, the first group of waveguide cores having an optical propagation direction, each of the first group of waveguide cores having at a respective first end thereof a first cross section defined by two dimensions measured along orthogonal coordinates and having at a respective second end thereof a second cross section defined by two dimensions measured along orthogonal coordinates; the first group of waveguide cores having an input port comprising at least one of: the respective first ends together comprising the optical input port for directed illumination, and a segment of one or more of the first group of waveguide cores comprising the optical input port for evanescent waves; and the first group of waveguide cores having an output port comprising at least one of: the respective second ends comprising the output port for directed illumination; and a segment of one or more of the first group of waveguide cores comprising the optical output port for evanescent waves; causing optical illumination to impinge on the optical input port of the composite waveguide; and recovering transmitted optical illumination from the optical output port of the composite waveguide.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Acronyms

Figure 1:
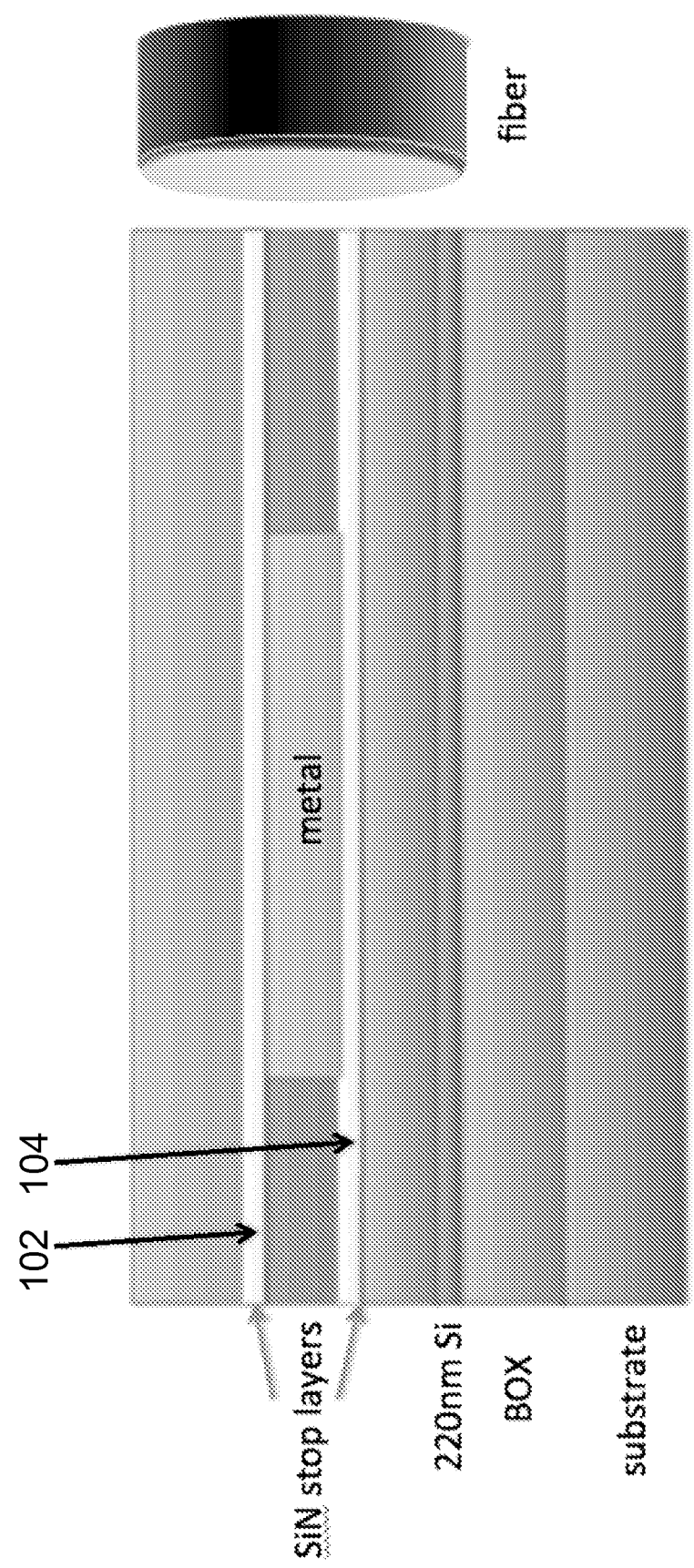
FIG. 1 is a cross section diagram of a composite waveguide according to principles of the invention.

A list of acronyms and their usual meanings in the present document (unless otherwise explicitly stated to denote a different thing) are presented below.

AMR Adabatic Micro-Ring
APD Avalanche Photodetector
ARM Anti-Reflection Microstructure
ASE Amplified Spontaneous Emission
BER Bit Error Rate
BOX Buried Oxide
CMOS Complementary Metal-Oxide-Semiconductor
CMP Chemical-Mechanical Planarization
DBR Distributed Bragg Reflector
DC (optics) Directional Coupler
DC (electronics) Direct Current
DCA Digital Communication Analyzer
DRC Design Rule Checking
DUT Device Under Test
ECL External Cavity Laser
FDTD Finite Difference Time Domain
FOM Figure of Merit
FSR Free Spectral Range
FWHM Full Width at Half Maximum
GaAs Gallium Arsenide
InP Indium Phosphide
$LiNO_3$ Lithium Niobate
LIV Light intensity(L)-Current(I)-Voltage(V)
MFD Mode Field Diameter
MPW Multi Project Wafer
NRZ Non-Return to Zero
PIC Photonic Integrated Circuits
PRBS Pseudo Random Bit Sequence
PDFA Praseodymium-Doped-Fiber-Amplifier
PSO Particle Swarm Optimization
Q Quality factor $$Q = 2\pi \times \frac{\text{Energy Stored}}{\text{Energy dissipated per cycle}} = 2\pi f_r \times \frac{\text{Energy Stored}}{\text{Power Loss}}.$$

QD Quantum Dot
RSOA Reflective Semiconductor Optical Amplifier
SOI Silicon on Insulator
SEM Scanning Electron Microscope
SMF Single Mode Fiber
SMSR Single-Mode Suppression Ratio
TEC Thermal Electric Cooler
WDM Wavelength Division Multiplexing An edge coupler is described that can be integrated into a fabrication line operating a CMOS process. An edge coupler fabricated according to principles of the invention provides a high coupling efficiency and a low polarization dependent loss when coupling to a standard single mode fiber (SMF).

The edge coupler can be any of a butt coupler, a coupler that can evanescently couple one waveguide to another or a coupler that uses a taper to couple into a structure such as a PIC chip.

As used herein the terms "a group of waveguides" or "a group of waveguide cores" means one or more waveguides that function together as a group. Mathematically one can define a group or a set as having no elements at all (the null group or null set), one element (the identity element), or more than one element. However, here we are explicitly excluding the null group from consideration, because the null group does not conform to any physical reality, while the other groups can and do correspond to physical embodiments.

We describe an edge coupler that is provided as a composite waveguide which comprises multiple waveguide cores. In various embodiments, the group of waveguide cores is fabricated using one or more silicon nitride layers that are used to stop the oxide etch in a typical damascene process. The process by which the composite waveguide is fabricated can be seamlessly integrated into a CMOS fabrication process. The composite waveguide can be fabricated using a standard CMOS fabrication line. One or more SiN strips can be configured to match the mode on the chip to a standard 10 µm single mode fiber for low mode mismatch loss. In a typical SOI wafer, the thickness of the buried oxide (BOX) layer is 2 µm. As the mode size is 10 µm, it is advantageous to move the mode center away from the substrate to avoid substrate loss. The composite waveguide can be fabricated using any material that will allow illumination of the desired wavelength to propagate therein. Examples of materials from which composite waveguides of the invention can be fabricated include crystalline silicon, poly-silicon, amorphous silicon, silicon nitride, silicon oxynitride, silicon dioxide, doped silicon dioxide and a polymer.

It is believed that the edge coupler of the invention provides a number of novel features.

As used herein, the term "directed illumination" means an optical beam that is observable as a beam travelling in a propagation direction, such as a beam provided by a laser, a beam focused by a lens, or a beam propagating in an optical carrier such an optical fiber or an optical waveguide. In contradistinction, the term "evanescent wave" means those waves coupled laterally from a waveguide carrying a directed illumination optical beam into an adjacent waveguide.

The edge coupler provides an apparatus that can couple to large mode directed illumination, which in some embodiments may be >5 µm. Larger modes provide greater tolerance. A 10 µm mode size is standard for fiber and enables packaging that is easier and less expensive to manufacture. As is described in greater detail hereinafter the composite waveguide is configured to interact with optical radiation present at the chip facet. In some embodiments, the composite waveguide ends at the facet. In other embodiments, the composite waveguide ends close enough to a facet to allow light to enter or leave the composite waveguide (e.g., within 10 µm, 20 µm, 30 µm, 40 µm, 50 µm, or 100 µm of a facet), but not precisely at a facet. In the composite waveguide, one waveguide core is tapered to have a larger facet, and others of the group of waveguide cores taper down to smaller dimensions. The illumination is concentrated by evanescent waves from the group of waveguide cores into a single waveguide which provides an optical output. In some embodiments, the cores of the composite waveguide can be tapered laterally or vertically, and they can taper to a smaller dimension or to a larger dimension.

In other embodiments, one can evanescently couple between different ones of the groups of waveguide cores so long as they are in sufficiently close proximity. In other embodiments, one can evanescently between a composite waveguide having a group of waveguide cores and a different type of optical waveguide that is in sufficiently close proximity. When evanescent coupling between a composite waveguide and another structure, such as a different type of waveguide, the coupling occurs along a segment of the composite waveguide, and the input port comprises a segment of the composite waveguide. In some embodiments of waveguides that perform evanescent coupling, the waveguide does not terminate at the location where the evanescent coupling is performed. In some embodiments of waveguides that perform evanescent coupling does terminate at the location where the evanescent coupling is performed. In some embodiments, the waveguide that performs evanescent coupling can also include a taper. In some embodiments, the waveguide that performs evanescent coupling turns into a dump port (e.g., the illumination passing along the waveguide is lost or discsrede after the location at which the evanescent coupling take place). In some embodiments, the waveguide that performs evanescent coupling can be in the same layer as one of the cores of a composite waveguide, or can be in a different layer than one of the cores of a composite waveguide.

In order to prevent optical losses caused by optical coupling into a silicon substrate, the edge couple of the invention is constructed at a level which is deliberately spaced away from the silicon substrate.

The edge coupler of the invention can also provide one or more transverse couplers (also termed "vertical couplers") that are able to couple optical power in a transverse direction relative to the optical path of the edge coupler (e.g., vertically) from the edge coupler to the silicon device layer. The transverse coupler can be fabricated to allow sequential optical steps through a number of layers using one or more vertical couplers.

The edge coupler of the invention also provides the ability to manufacture devices comprising the edge coupler using back-end integration. In general it is difficult to integrate any layers into the chip backend stack. According to principles of the invention, the edge couplers can be built by using one or more SiN stop layers present in the CMOS flow that are ordinarily provided for use as chemical/polish etch stop layers.

FIG. 1 is a cross section diagram of a composite waveguide according to principles of the invention. In the fabrication line, the metal layers are deposited above the silicon device layer, and the SiN stop layers 102, 104 between the metal layers are several microns higher than the silicon layer, as shown in FIG. 1. Using these SiN layers can effectively reduce the substrate loss. After the optical power is coupled to the SiN waveguide core, a vertical coupler can be used to transfer the power to the silicon device layer.

A second feature of this architecture is that the SiN stop layers that are present in the damascene process can also be used to couple light vertically in the chip to an output coupler that is further from the substrate. This helps move the center of the mode away from the substrate, thereby further reducing loss due to substrate coupling.

First Example Embodiment

Figure 2A:
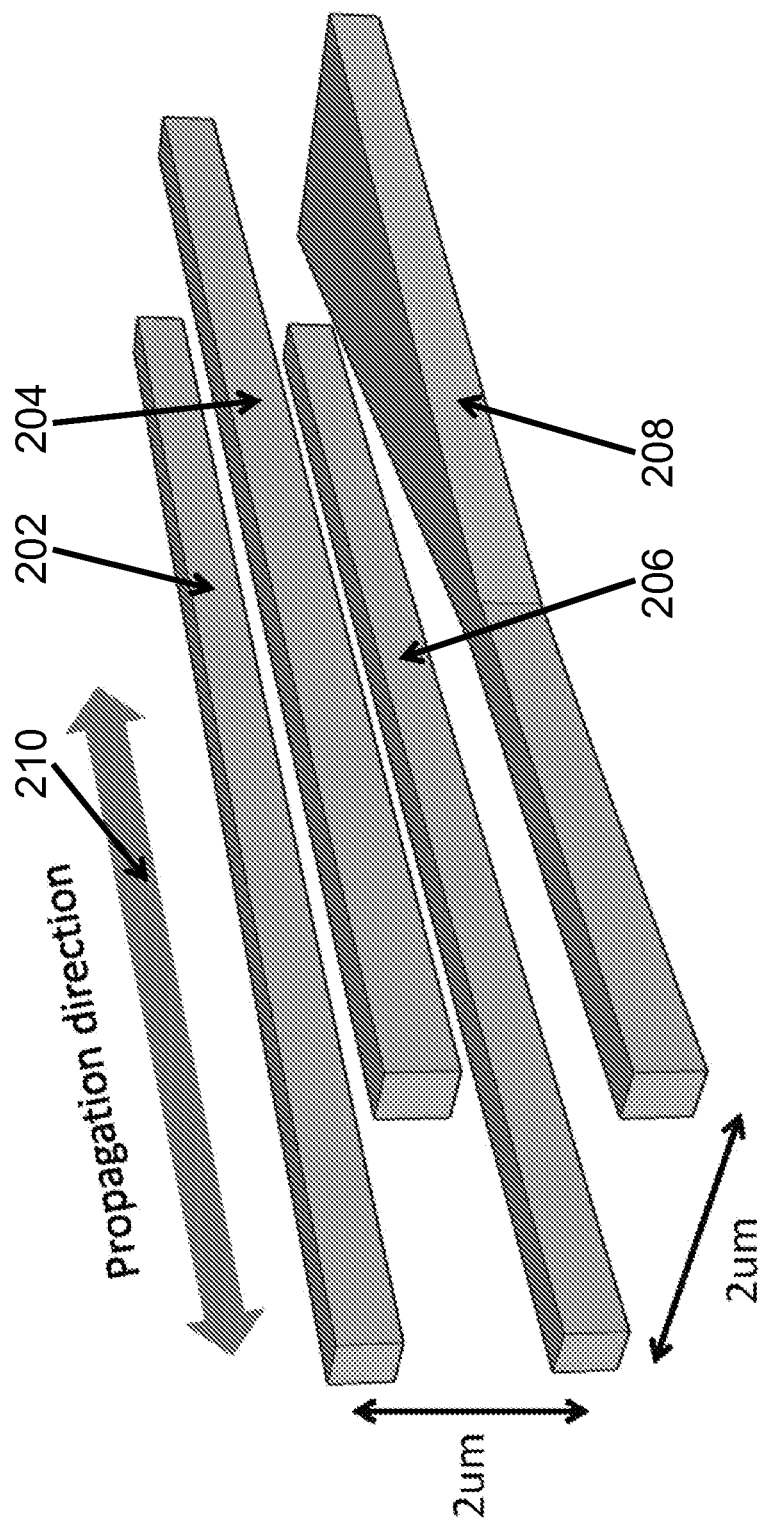
FIG. 2A is a perspective diagram of a composite waveguide having a group of waveguides according to the principles of the invention.

An embodiment of an edge coupler built using two SiN 102, 104 stop layers is designed for use with a standard single mode fiber. FIG. 2A is a perspective diagram of a composite waveguide having a group of waveguide cores according to the principles of the invention.

The thickness of each SiN layer is 120 nm, and the $SiO_2$ between the two layers is 2 µm thick. On each layer, there are two SiN waveguide cores (202, 204) (206, 208) with 2 µm center-to-center separation, and the width of the waveguide cores are each 300 nm. As illustrated in FIG. 2A, the lower-right waveguide core 208 is used as output, and is tapered from 300 nm width×120 nm height to 1 µm width× 120 nm height with a length of 100 µm.

In various embodiments, the width of the waveguide core used as the coupler may be varied, to see how the behavior changes with width. FIG. 3A-FIG. 3D are diagrams of mode profiles of the group of waveguide cores for selected widths of the edge coupler.

Figure 2B:
FIG. 2B is another perspective diagram of a composite waveguide having a group of waveguides according to the principles of the invention.

FIG. 2B is another perspective diagram of a composite waveguide having a group of waveguides.

Figure 2C:
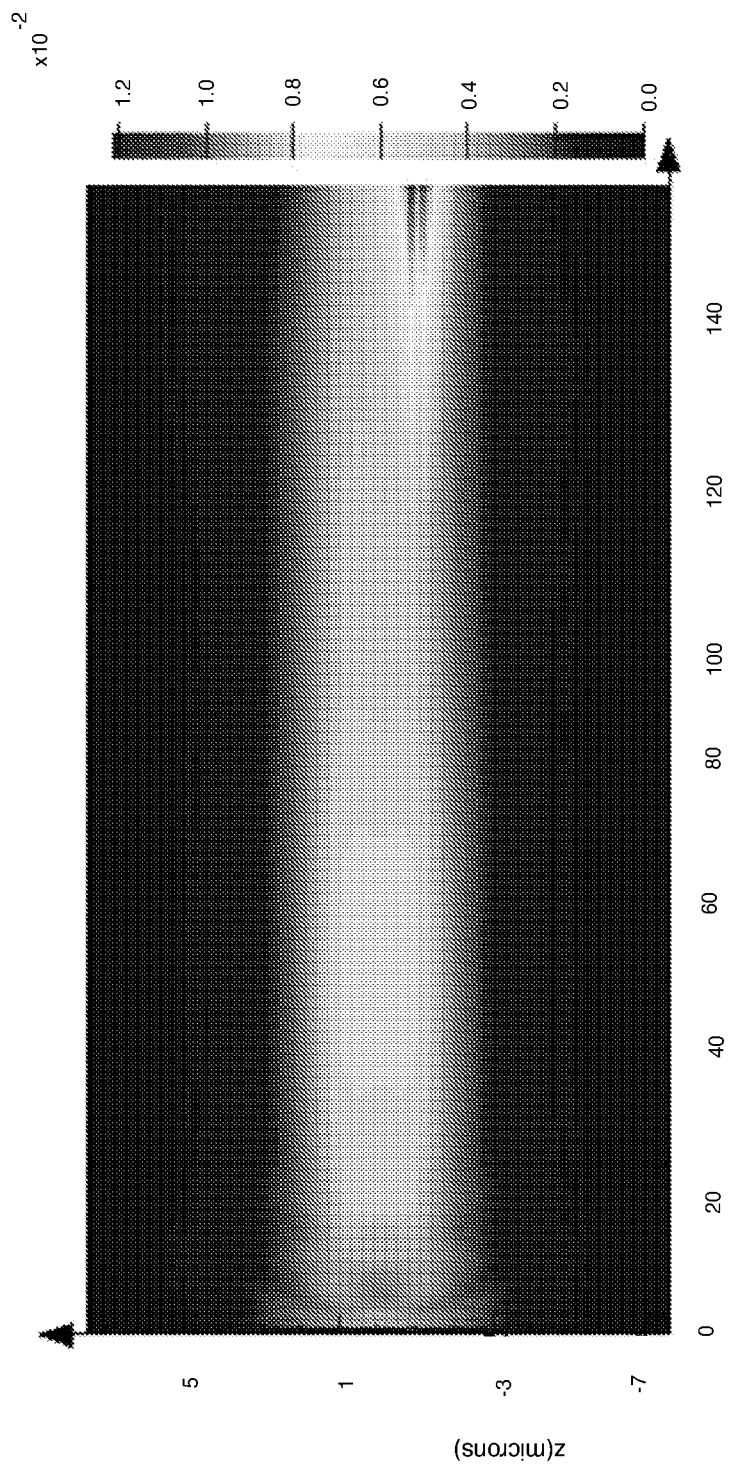
FIG. 2C is a side view diagram showing the optical intensity in the composite waveguide of FIG. 2B as a function of distance from the input facet.

FIG. 2C is a side view diagram showing the optical intensity in the composite waveguide of FIG. 2B as a function of distance from the input facet. As may be understood from FIG. 2C, at the input end of the composite waveguide (the left end of the diagram) the optical intensity in each of the four waveguide cores is approximately equal. At the output end of the composite waveguide, the majority of the intensity has been evanescently coupled into one of the waveguide cores (e.g., the output waveguide core such as 208 of FIG. 2A), and the intensity is increased in the output waveguide by a factor of approximately 2 to 3 times over the intensity at the input end of the same waveguide core.

Figures 2D, 2E:
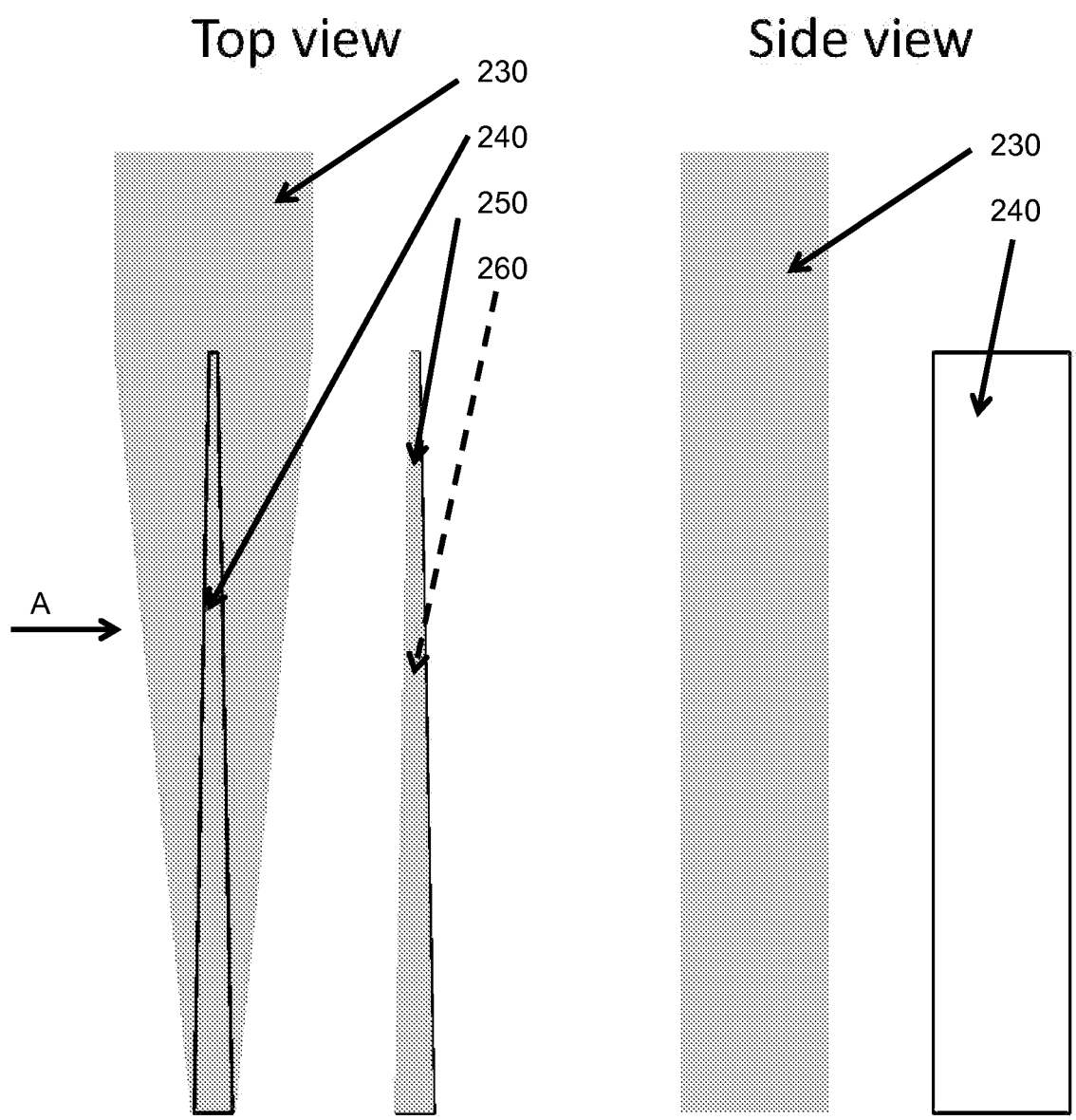
FIG. 2D is a schematic diagram of tapered waveguide cores seen in a view from the top.
FIG. 2E is a schematic diagram of tapered waveguide cores seen in a view from the side.

FIG. 2D is a schematic diagram of tapered waveguide cores seen in a view from the top. In the embodiment shown in FIG. 2D, there are shown a waveguide core 230 that tapers from a narrower width at the bottom of the drawing to a wider width at the top, and a number of waveguide cores 240, 250 (and 260 indicated by a dotted arrow, which is below 250 and is occluded from view, but is the same shape as 250). Waveguide core 240 is nearer the viewer than waveguide core 230 as shown in FIG. 2D, and can be seen to taper from a width at the bottom of the drawing that is close to the width of waveguide core 230 to a narrower width near the top of the drawing. The arrow labeled "A" at the left of FIG. 2D indicates the orientation of the view shown in FIG. 2E.

FIG. 2E is a schematic diagram of tapered waveguide cores seen in a view from the side. As seen in the embodiment illustrated in FIG. 2E, the waveguide core 230 is longer than the waveguide core 240, but both have similar width dimensions as seen in the side view. Waveguide cores 250 and 260 are occluded by waveguide cores 240 and 230, respectively in the view shown in FIG. 2E.

Figure 3A:
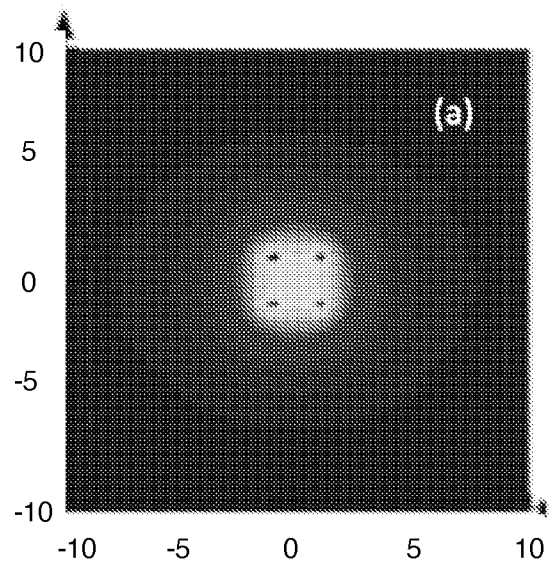
FIG. 3A-FIG. 3D are diagrams of mode profiles of the group of waveguide cores for selected widths at the edge coupler.
Figure 3B:
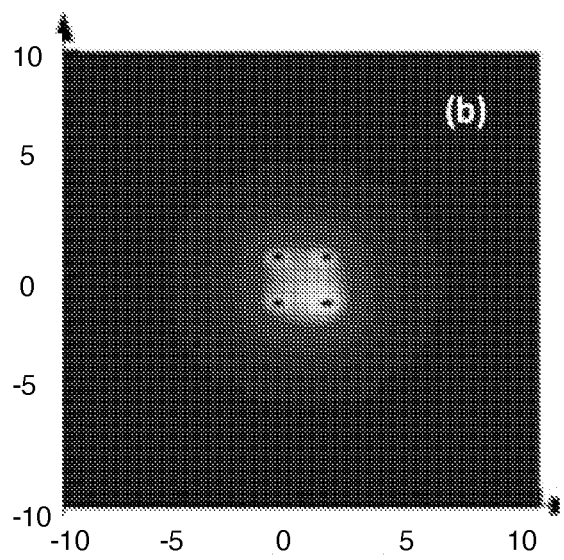
Figure 3C:
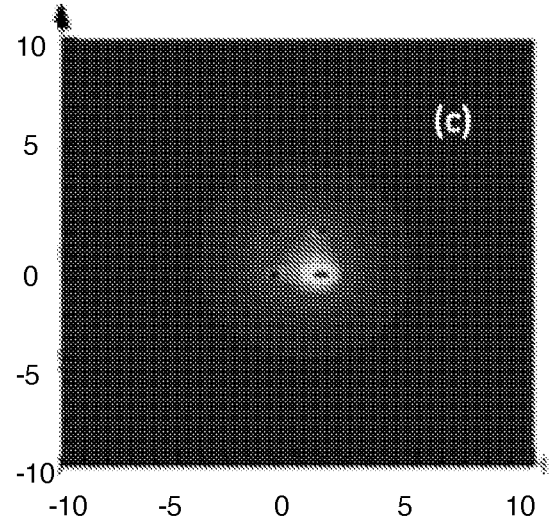
Figure 3D:
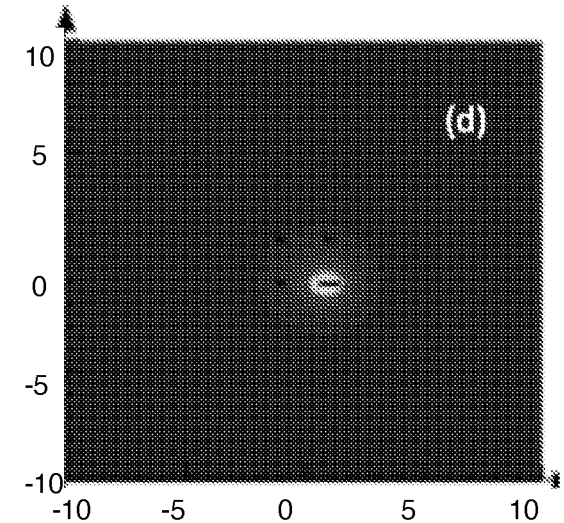

The mode profile of the composite waveguide as shown in FIG. 3A-FIG. 3D, in which the width of the lower-right waveguide core 208 is 300 nm in FIG. 3A, 400 nm in FIG. 3B, 500 nm in FIG. 3C and 800 nm in FIG. 3D. At the end of the coupler where all the waveguide cores have equal width, the mode profile is a combination of the modes of all the SiN waveguide cores, and the optical power is equally distributed in the four waveguide cores. In order to couple to silicon waveguides, the mode size must be compressed. The lower-right waveguide core becomes wider along the propagation direction, so that the optical power will be concentrated in this waveguide core due to mode evolution.

Figure 4A:
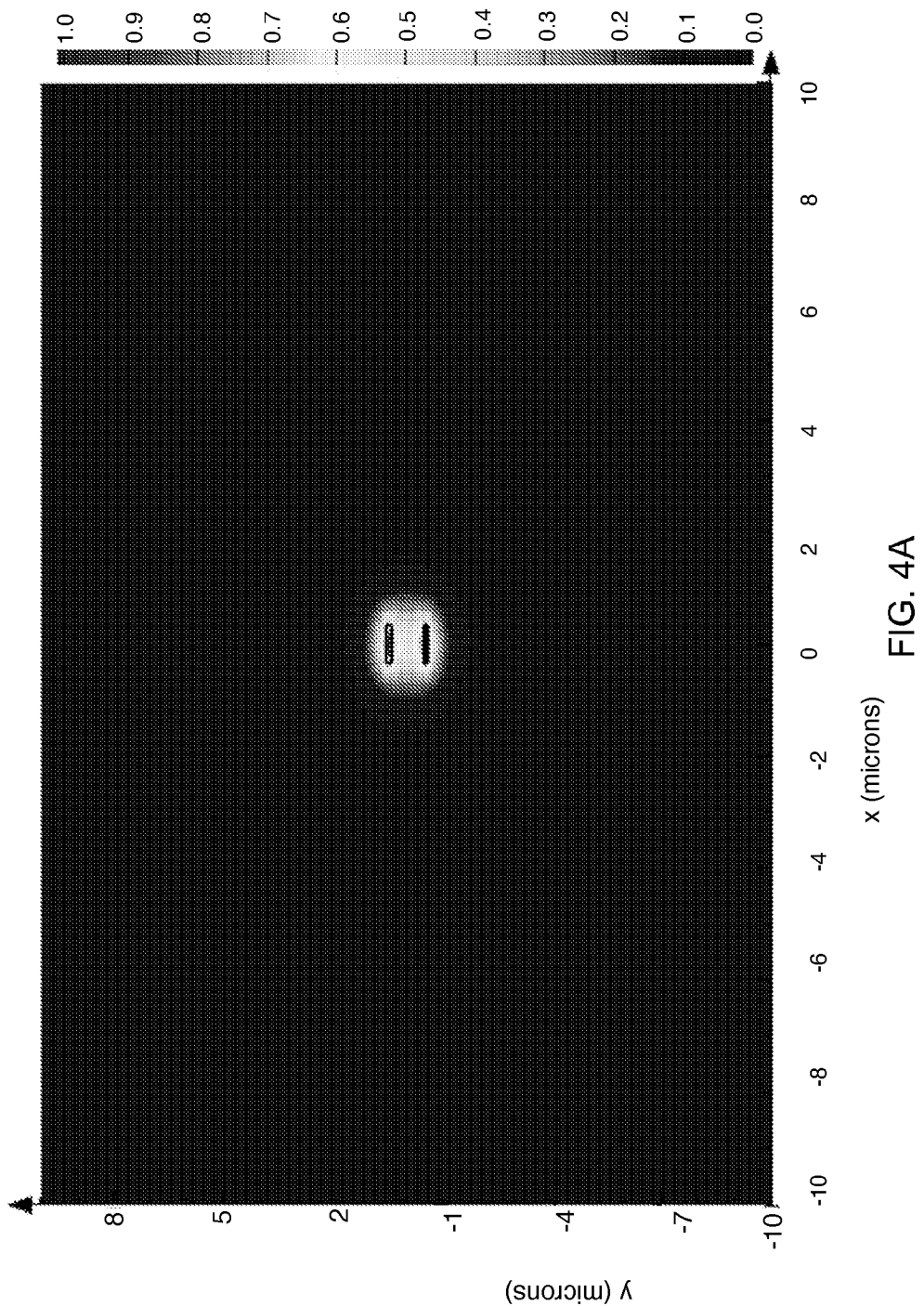
FIG. 4A is a diagram of a mode profile of a composite waveguide of the invention having two waveguide cores.
Figure 4B:
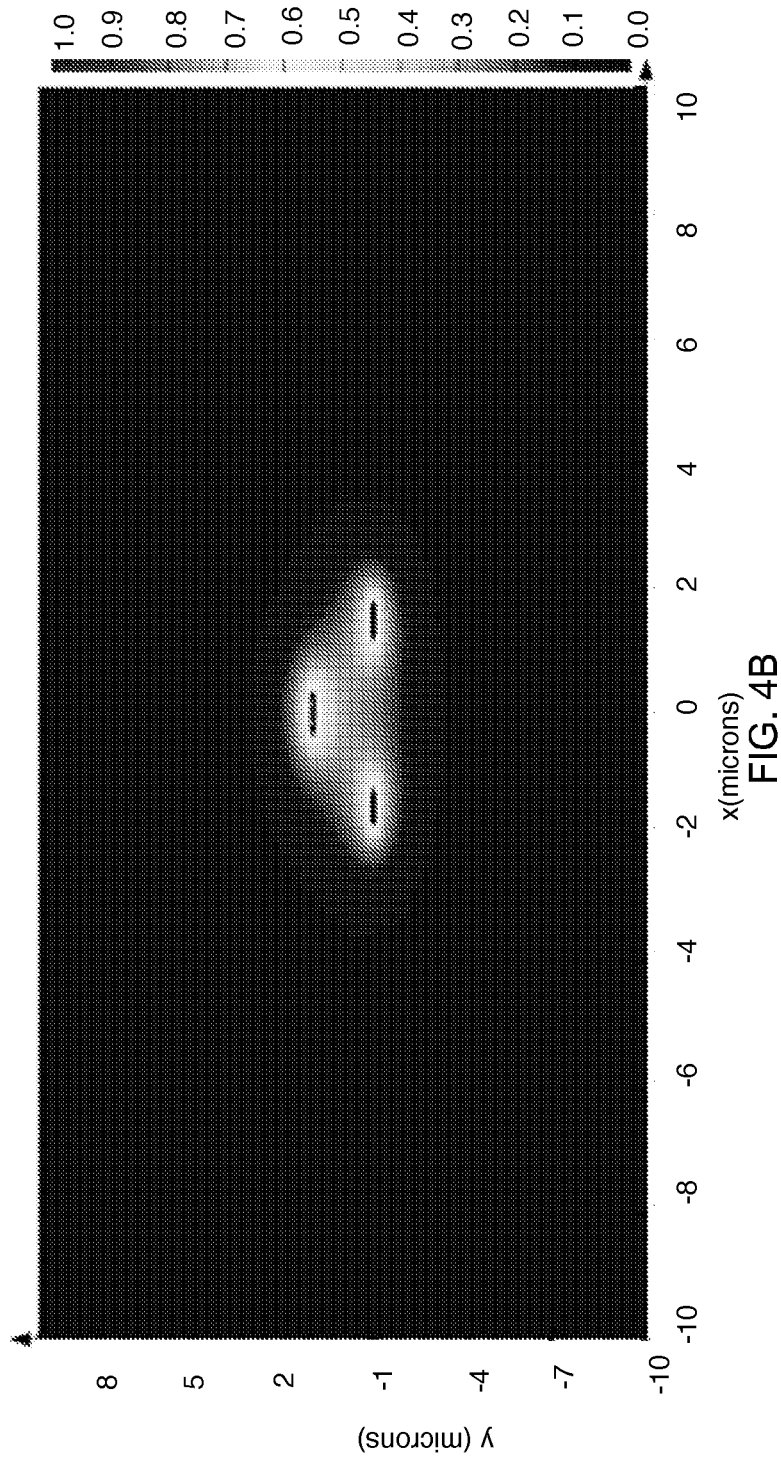
FIG. 4B is a diagram of a mode profile of a composite waveguide of the invention having three waveguide cores.
Figure 4C:
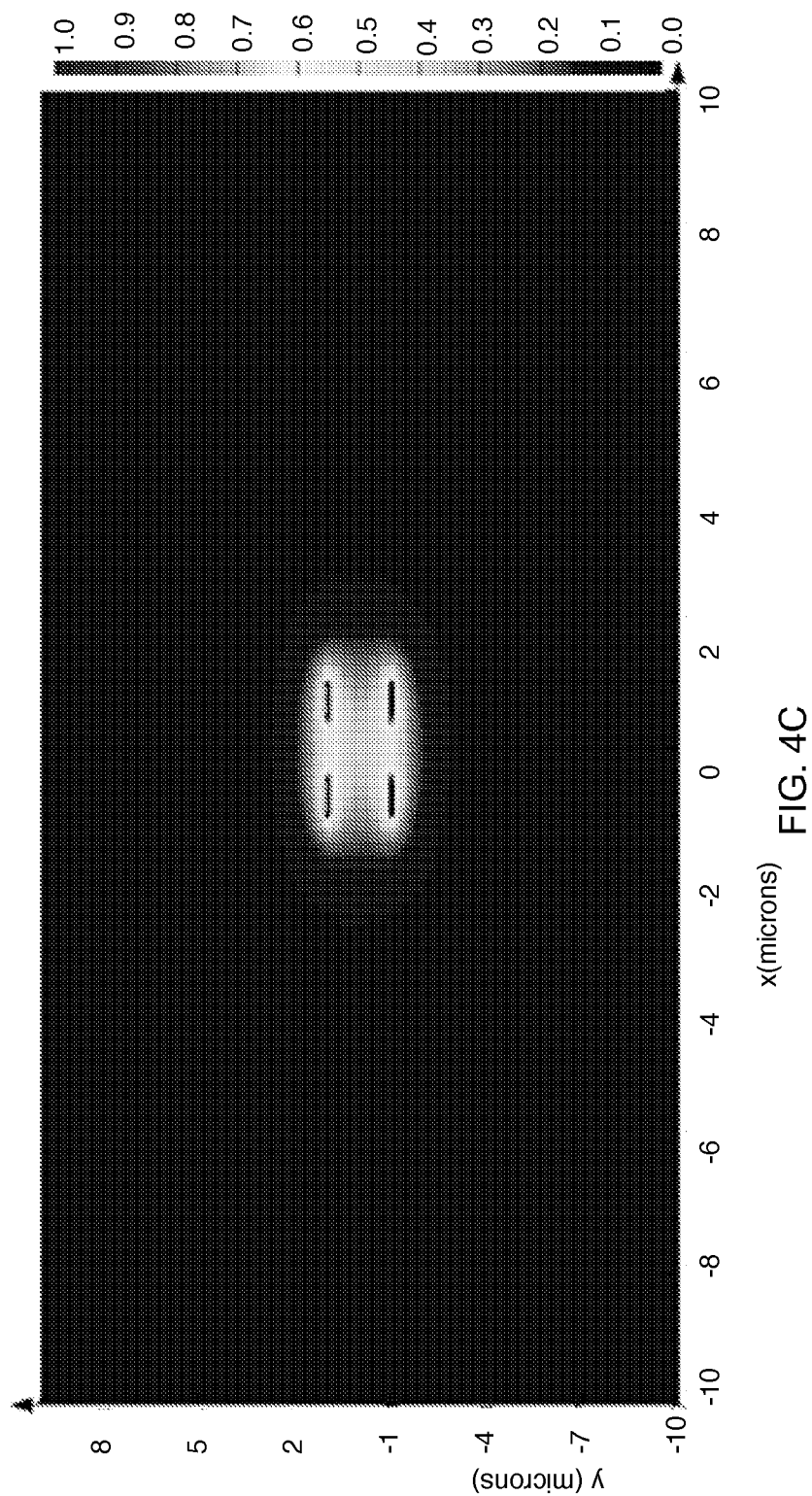
FIG. 4C is a diagram of a mode profile of a composite waveguide of the invention having four waveguide cores.

As illustrated in the embodiments shown in FIG. 4A, FIG. 4B and FIG. 4C, the composite waveguide of the invention can have two, three or four waveguide cores. In general, the composite waveguide can have a group of waveguide cores (e.g., any convenient number N of, where in in an integer equal to or greater than 2). The geometrical arrangement of the group of waveguide cores can be in a linear array or a two dimensional array as seen from an input end or an output end of the composite waveguide. In some embodiments, the geometrical arrangement of the group of waveguide cores can be a triangular arrangement, a rectangular arrangement, a square arrangement, a hexagonal arrangement (which can be generated from a group of triangular arrangements), or any convenient geometrical arrangement, such as a circular arrangement. The array can be periodic or non-periodic.

The physics exhibited by the composite waveguide having a group of waveguide cores may be explained as follows. The group of waveguide cores interact with each other by way of evanescent electromagnetic waves, so that optical energy or optical intensity can be transferred between or among two or more of the group of waveguide cores. As illustrated in FIG. 3A through FIG. 3D, the optical intensity on a group of waveguide cores that are in evanescent optical communication can transfer optical intensity. In FIG. 3A, the evanescent coupling is such that significant optical intensity exists at the output end of the composite waveguide in each of the four illustrated waveguide cores. In FIG. 3D, the evanescent coupling is such that significant optical intensity exists at the output end of only one of the four illustrated waveguide cores in the composite waveguide, and the optical intensity in the other three of the four illustrated waveguide cores has been diminished considerably, so that a single one of the waveguide cores serves as the output. In each of the embodiments illustrated in FIG. 3A through 3D, the input ends of the four waveguide cores are all substantially the same size, and all terminate at a chip facet.

It is believed that evanescent coupling can also be used to cause light to propagate in and interact with other types of structures such as gain media, non-linear media, opto-magnetic media (such as yttrium iron garnet), photoconductive media, and photo-absorptive media.

Figure 5A:
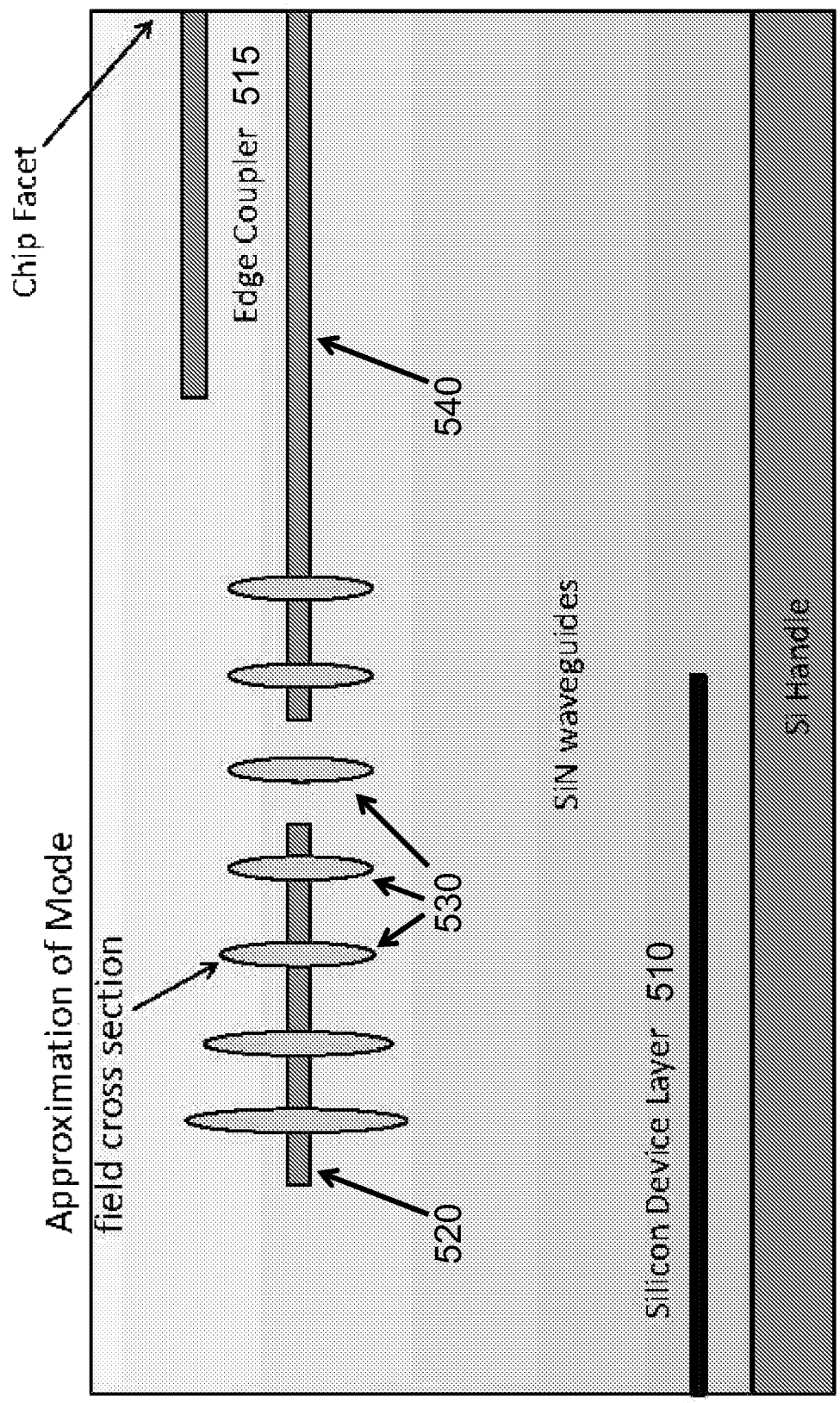
FIG. 5A is a schematic diagram of the propagation of directed illumination along a waveguide.

FIG. 5A is a schematic diagram of an embodiment that illustrates the propagation of directed illumination along a waveguide, such as a composite waveguide of the invention. As shown in FIG. 5A, a chip has a silicon device layer 510 and an edge coupler 515 provided therein. Two waveguides 520 and 540 are present in an aligned configuration, such that a propagation direction of illumination in one waveguide is aligned with a propagation direction of illumination in the other waveguide. Light waves 530 propagate along the waveguides 520, 540 in either direction, and pass from one waveguide to the other in the same direction as the propagation direction. In some embodiments, the waveguides 520 and 540 are fabricated from silicon nitride (SiN).

The embodiment of the composite waveguide shown in FIG. 5A can be a butt coupler that is a continuous extension of the composite waveguide. In other embodiments, the composite waveguide can provide a discontinuous butt-coupling between two types of waveguides. The waveguide can be on the same or different layers of the device.

Figure 5B:
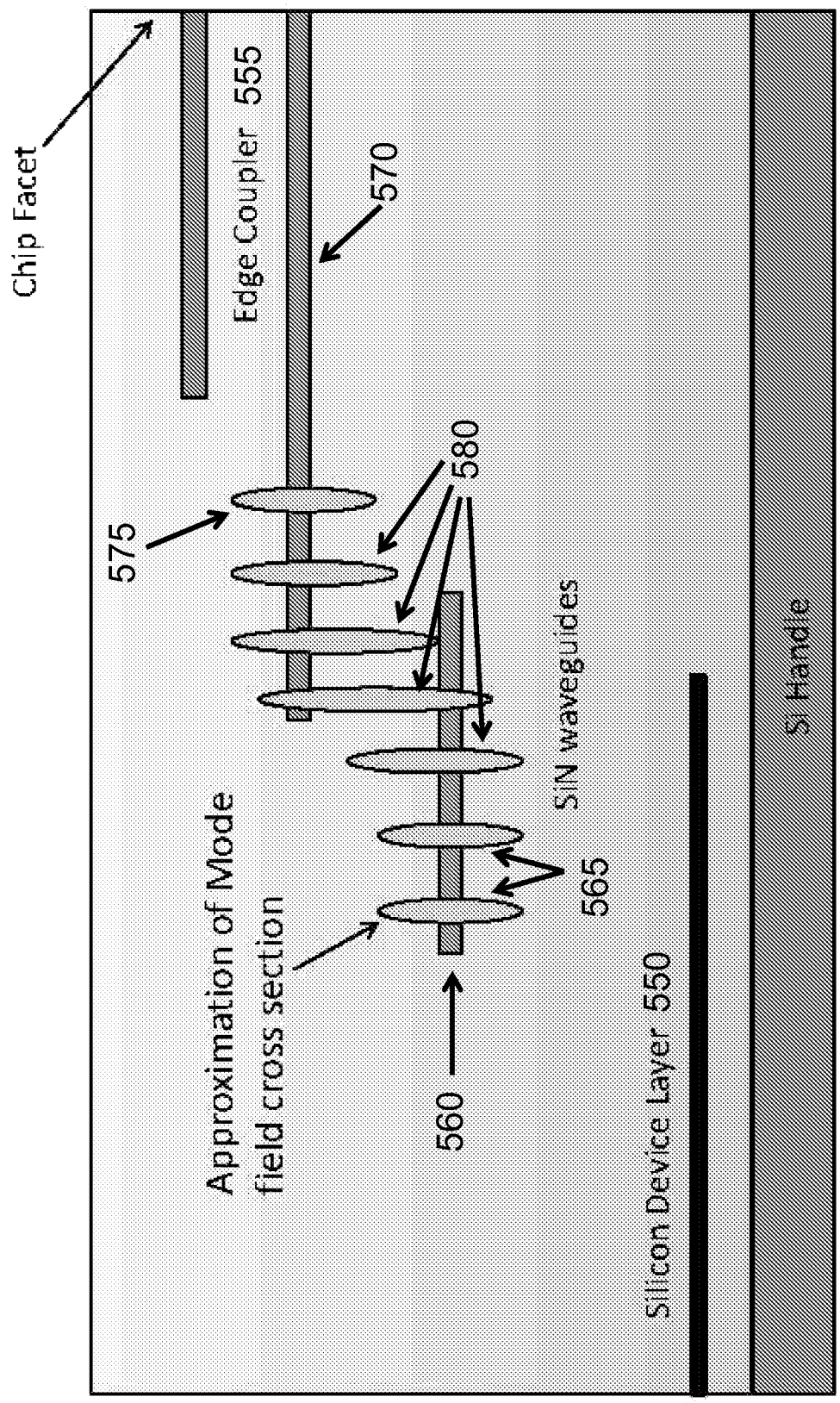
FIG. 5B is a schematic diagram of the propagation of evanescent radiation between two waveguides.

FIG. 5B is a schematic diagram of an embodiment that illustrates the propagation of evanescent radiation between two waveguides. As shown in FIG. 5B, a chip has a silicon device layer 550 and an edge coupler 555 provided therein. Two waveguides 560 and 570 are present in a configuration in which their propagation axes are aligned but they are offset one from the other in a direction transverse to the propagation direction, so that a propagation direction of illumination in one is parallel with a propagation direction of illumination in the other but is laterally offset. Light waves 575 propagate along the waveguide 570 and light waves 565 propagate along the waveguide 560 in either direction. The light passes from one waveguide to the other by evanescent propagation, as illustrated by light waves 580. The evanescent propagation can occur in either direction (e.g., from waveguide 560 to waveguide 570, or from waveguide 570 to waveguide 560). The light continues to propagate with a waveguide in the same direction as the propagation direction. In some embodiments, the waveguides 560 and 570 are fabricated from silicon nitride (SiN).

Figure 6:
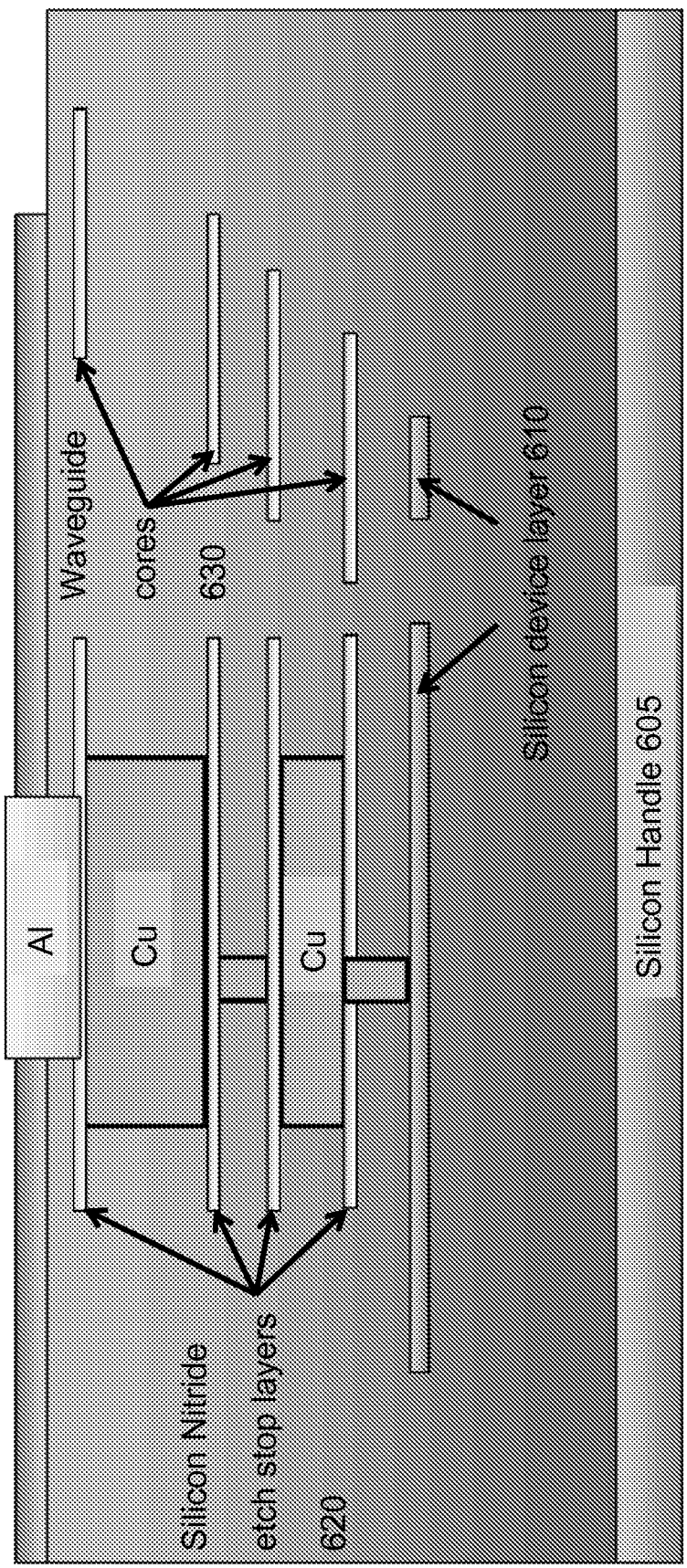
FIG. 6 is a diagram in cross section of a semiconductor chip that includes composite waveguides constructed according to principles of the invention.

FIG. 6 is a diagram in cross section of a substrate, such as a semiconductor chip, that includes composite waveguides constructed according to principles of the invention. In the embodiment illustrated, the chip has a silicon handle 605, a device layer 610 adjacent the silicon handle, and a group of SiN etch stop layers 620, some of which are used to define and construct a series of metal interconnect layers such as copper (Cu) layers, and electrical terminals constructed from aluminum (Al). The edge connector is illustrated at the upper right side of the chip and is constructed of waveguide cores 630 fabricated from some of the SiN layers. Illumination can enter the chip from a facet at the right side. In some embodiments, the substrate can be a support that is not a semiconductor chip.

Figure 7:
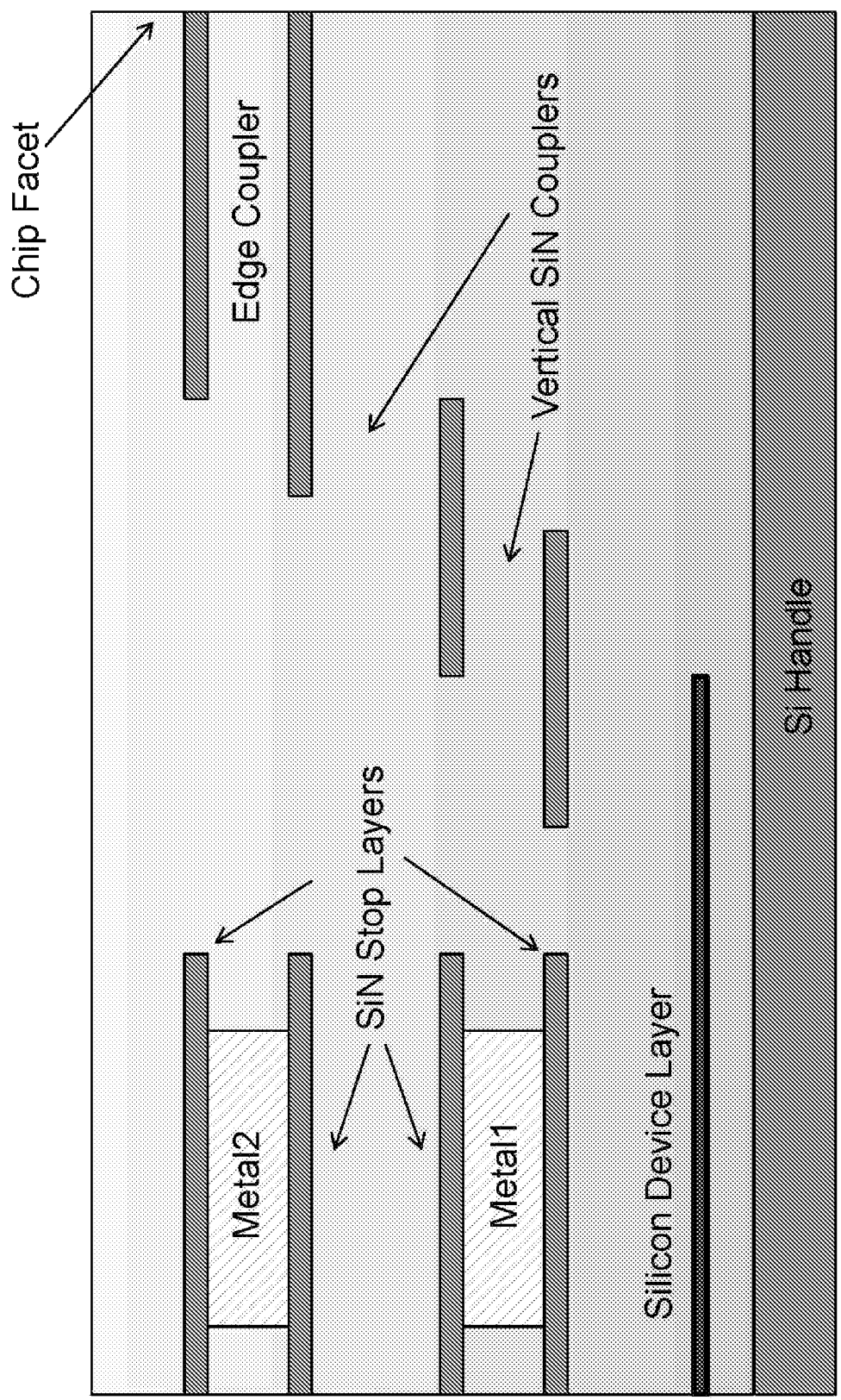
FIG. 7 is a diagram in cross section of another view of the semiconductor chip of FIG. 6.

FIG. 7 is a diagram in cross section of another view of the semiconductor chip of FIG. 6, in which the chip facet, the edge couple, the vertical couplers, the multilevel metallization, the device layer and the silicon handle are illustrated. In particular in FIG. 7, there are present a number of SiN stop layers 720 that are provided as part of a CMOS fabrication process. The SiN layers can be used as elements of vertical SiN couplers 710 that operate evanescently as illustrated in the embodiment shown in FIG. 5B.

Embodiments of the coupler can be used to couple in light from an external source such as a single mode fiber, an external laser, or another chip. Embodiments of the coupler can be used to receive light from an on-chip source such as an on-chip laser. Embodiments of the coupler may also be used to couple light from an on-chip laser out to an external target. Embodiments of the coupler may also be used to couple light in both directions simultaneously. Embodiments of the coupler may also be used to couple bidirectionally. The term "bidirection coupling" can mean in two directions at the same time (also described as duplex operation), or the term "bidirection coupling" can mean coupling in two directions at distinct times (also described as half-duplex operation).

Figure 8:
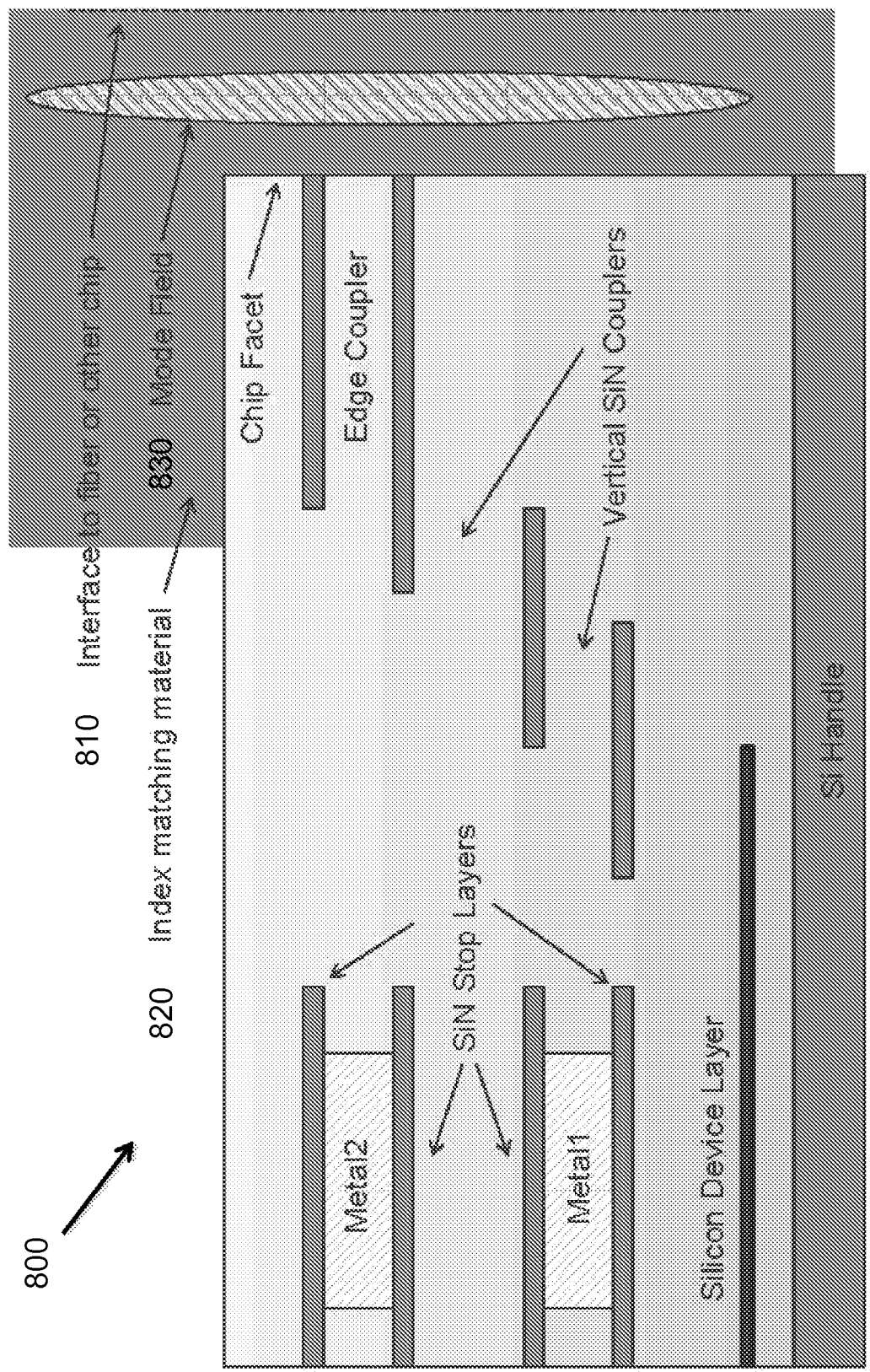
FIG. 8 is a diagram in cross section of another view of the semiconductor chip of FIG. 6.

FIG. 8 is a diagram 800 in cross section of another view of the semiconductor chip of FIG. 6. In FIG. 8 there is shown in dotted outline a mode field 830 of illumination that is provided by a source, such as an optical fiber connected to a laser. The mode field is larger in size than the dimensions of the composite waveguide, or edge coupler. The mode may extend above the silicon chip surface. There are three options that may be employed to deal with this circumstance. In one embodiment there is an option to do nothing and let the mode interact with air. This is illustrated in FIG. 7. In one embodiment there is another option to provide additional silicon dioxide above the chip so that the mode is more fully enclosed. This may be viewed in FIG. 8 as adding the index matching material 820. In one embodiment there is a third option to add an index matching material other than oxide such as index-matching gel or index matching epoxy to the top of the chip. This is an example of providing a different index matching material 820.

In addition to the index matching gel or epoxy on the top of the chip, it may be advantageous to provide the same type of material at the edge facet of the chip when coupling to a fiber or another chip. This is illustrated as interface to fiber or other chip 810. This same material can then be deposited just once to be present at both the edge interface and the vertical surface (near the edge). A material with structural properties such as epoxy can then be used for the purposes of bonding a fiber (or second chip) to the chip, providing an index-matched interface at the edge of the chip and providing an index-matched cladding above the silicon chip surface.

In some embodiments, the composite waveguide comprises a group of waveguide cores to couple to fibers. In some embodiments, the group of waveguide cores are arranged in one or two dimensions.

In some embodiments, the interconnect process in the back end uses nitride in the back end that is left over from the damascene processes used to build the back-end metal stack.

In some embodiments, one can explicitly add nitride layers which are not left over from the back end metallization process. In some embodiments, the nitride layers are interspersed into the back end metal stack.

In some embodiments, the waveguide cores have tapers with varying geometries.

In some embodiments, there is provided independent phase controls on different waveguide cores that can be used for beam steering.

In some embodiments, photodetectors are integrated into the composite waveguide structure. The photodetectors can be used for monitoring the optical signals that propagate in the waveguide cores.

In some embodiments, a waveguide core comprises an etched facet.

In some embodiments, a waveguide core comprises a polished facet.

In some embodiments, a waveguide core comprises a sawed facet.

In some embodiments, a waveguide core comprises a facet oriented at an angle to the length dimension of a waveguide core.

In some embodiments, an angled facet is used to change a plane of propagation of illumination.

In some embodiments, a lens is provided between an end of a waveguide core and an end of an optical fiber. The lens in some embodiments may be outside of the chip that carries the waveguide core.

In some embodiments, the composite waveguide is used in conjunction with a tapered fiber.

In some embodiments, the composite waveguide is used in conjunction with a small mode fiber.

In some embodiments, the devices of the invention are used to manipulate polarizations of propagating light, with manipulation of one or both of two different polarizations.

In some embodiments, the edge couplers of the invention are used to couple light into or out of a high confinement silicon waveguide.

In some embodiments, the edge couplers of the invention are used to couple light to another optical carrier through free space, for example using external lenses.

In some embodiments, there are provided integrated structures that use the low confinement of the waveguide. For example, a grating can be provided to take advantage of the low confinement.

In some embodiments, the edge couplers of the invention are provided in combination with semiconductor optical amplifiers (SOAs) or other gain media to provide gain. It is believed that one can thereby provide gain without having to etch the oxide.

In some embodiments, nonlinear optical media can be provided in conjunction with the edge couplers of the invention, for example by being bonded to a surface of a wafer.

Design and Fabrication

Methods of designing and fabricating devices having elements similar to those described herein are described in one or more of U.S. Pat. Nos. 7,200,308, 7,339,724, 7,424, 192, 7,480,434, 7,643,714, 7,760,970, 7,894,696, 8,031,985, 8,067,724, 8,098,965, 8,203,115, 8,237,102, 8,258,476, 8,270,778, 8,280,211, 8,311,374, 8,340,486, 8,380,016, 8,390,922, 8,798,406, and 8,818,141, each of which documents is hereby incorporated by reference herein in its entirety.

Definitions

As used herein, the term "optical communication channel" is intended to denote a single optical channel, such as light that can carry information using a specific carrier wavelength in a wavelength division multiplexed (WDM) system.

As used herein, the term "optical carrier" is intended to denote a medium or a structure through which any number of optical signals including WDM signals can propagate, which by way of example can include gases such as air, a void such as a vacuum or extraterrestrial space, and structures such as optical fibers and optical waveguides.

As used herein, the term "damascene" or "damascene process" refers to a process for forming copper IC interconnects using an additive processing technique. The Damascene process was originated by IBM in the 1990s, and has been described in numerous patent documents, including U.S. Pat. Nos. 5,262,354, 5,300,813, 5,403,779, 5,426,330, 6,140,226 and many others.

The Damascene process includes depositing a dielectric on a semiconductor wafer, such as an SOI wafer; etching the dielectric according to a defined photoresist pattern; depositing a barrier layer; depositing a conductor such as copper, for example by electroplating, in some cases using a two-step process in which a seed layer is deposited on the wafer using PVD, and then electroplating copper is electroplated, followed by a planarization, for example by CMP. In some embodiments, the dielectric is silicon nitride. In other embodiments, the dielectric can be made of other materials, such crystalline silicon, poly-silicon, amorphous silicon, silicon nitride, silicon oxynitride, silicon dioxide, doped silicon dioxide and polymer.

A Dual Damascene process can also be used, for example to create vias and lines by etching holes and trenches in the dielectric, and then depositing copper in both features. One photo/etch step is used to make holes (vias) in the dielectric so as to make connection with underlying metal, while a second photo/etch step is used to make trenches for the metal line. The two photo/etch steps can be performed in either order.

As used herein, the term "front end of the line" refers to the portion of a semiconductor fabrication process or facility in which a wafer having individual components or devices (e.g., transistors, capacitors, resistors, inductors, and the like) are fabricated on a wafer.

As used herein, the term "back end of the line" refers to the portion of a semiconductor fabrication process or facility in which the individual components or devices are interconnected with metallization (or wiring) on the wafer. The metallization can include multiple metallization layers.

As used herein, the term "optical propagation direction" as applied to a waveguide having at least two ends means that an optical signal propagates along the waveguide including going around bends if the waveguide is so configured, so that the optical signal enters the waveguide at a first location, such as a first end, and exists the waveguide at a different location, such as a second end. For a closed loop waveguide, the propagation direction is around the loop in a first sense or in a second sense, e.g., clockwise or counterclockwise.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A photonic integrated circuit (PIC) comprising:
   a substrate;
   an optical device layer supported over the substrate;
   a coupler configured for coupling light vertically to or away from the optical device layer, the coupler comprising a vertical coupler and an edge coupler for coupling the light between a side facet of the PIC and the optical device layer, the edge coupler spaced away from the substrate, with the optical device layer and the vertical coupler between the substrate and the edge coupler, thereby reducing loss due to substrate coupling;
   the coupler comprising a plurality of waveguide cores vertically offset from the optical device layer and each other, each waveguide core configured for propagating the light in a propagation direction parallel to each other, and configured for coupling the light, sequentially and evanescently, between adjacent vertically offset waveguide cores of the plurality of waveguide cores.

2. The PIC according to claim 1, wherein the edge coupler includes:
   a first waveguide core including a first input end and a narrower first output end;
   a second waveguide core including a second input end, substantially a same width as the first input end of the first waveguide, and a wider second output end.

3. The PIC according to claim 2, wherein the second waveguide core is longer than the first waveguide core.

4. The PIC according to claim 2, wherein the edge coupler includes:
   a third waveguide core laterally offset from the first waveguide core.

5. The PIC according to claim 4, wherein the third waveguide core including a third input end and a narrower third output end.

6. The PIC according to claim 4, wherein the edge coupler includes:
   a fourth waveguide core laterally offset from the second waveguide core.

7. The PIC according to claim 6, wherein the fourth waveguide core includes a fourth input end and a narrower fourth output end.

8. The PIC according to claim 4, wherein the vertical coupler includes one or more additional waveguide cores configured to couple the light in a transverse direction relative to the propagation direction of the edge coupler from the edge coupler to the optical device layer.

9. The PIC according to claim 1, further comprising a multilevel metallization above the optical device layer including a plurality of stop layers therebetween; wherein each of the plurality of waveguide cores is comprised of a portion of one of the stop layers.

10. The PIC according to claim 9, wherein each stop layer comprises a dielectric material enabling illumination of a desired wavelength.

11. The PIC according to claim 10, wherein the dielectric material is selected from the group consisting of silicon nitride, silicon oxynitride, silicon dioxide, doped silicon dioxide.

12. The PIC according to claim 1, wherein the optical device layer includes a laser for generating the light for output the coupler to a second waveguide.

13. The PIC according to claim 1, wherein the optical device layer includes a photodetector for receiving light from a second waveguide via the coupler.

14. The PIC according to claim 4, wherein the first waveguide core, the second waveguide core and the third waveguide core comprise a composite waveguide configured for converting a mode size of the light between less than 1 µm and greater than 5 µm.

15. The PIC according to claim 4, wherein a first end of each of the first waveguide core, the second waveguide core and the third waveguide core includes a width of less than 1 micron and a thickness of less than 1 micron.

16. The PIC according to claim 1, wherein each of the plurality of waveguide cores includes a thickness of about 120 nm.

17. The PIC according to claim 2, wherein the second waveguide core includes a width that expands from about 300 nm at the second input end to about 1 µm at the second output end.

18. A method of manufacturing a photonic integrated circuit (PIC) comprising:
providing an optical device layer including a first waveguide on a substrate;
depositing a first stop layer above the optical device layer;
depositing a first metal layer on the first stop layer;
depositing a second stop layer on the first metal layer;
depositing a second metal layer on the second stop layer;
depositing a third stop layer on the second metal layer; and
patterning the first, second and third stop layers into a plurality of waveguide cores forming a coupler for vertically coupling light away from the optical device layer, thereby reducing loss due to substrate coupling; the coupler comprising the plurality of waveguide cores vertically offset from the optical device layer and each other, each of the plurality of waveguide cores configured for propagating the light in a propagation direction parallel to each other, and configured for coupling the light sequentially and evanescently between adjacent vertically offset waveguide cores of the plurality of waveguide cores.

19. The method according to claim 18, wherein the coupler includes:
a first waveguide core including a first input end and a narrower first output end;
a second waveguide core including a second input end, substantially a same width as the first input end of the first waveguide, and a wider second output end.

* * * * *